US006978232B1

(12) United States Patent
Tobler

(10) Patent No.: US 6,978,232 B1
(45) Date of Patent: Dec. 20, 2005

(54) METHOD AND SYSTEM OF DEMONSTRATING A SERVICE THAT PROVIDES COMPUTERIZED TRANSACTIONS USING A COMPUTER NETWORK

(75) Inventor: David L. Tobler, Snohomish, WA (US)

(73) Assignee: Interland, Inc., Atlanta, GA (US)

( * ) Notice: Subject to any disclaimer, the term of this patent is extended or adjusted under 35 U.S.C. 154(b) by 856 days.

(21) Appl. No.: 09/607,798

(22) Filed: Jun. 30, 2000

(51) Int. Cl.[7] .................................................. G06F 9/44
(52) U.S. Cl. ........................................ 703/21; 709/223
(58) Field of Search .......................... 703/21; 709/232, 709/223, 224, 209, 203, 219, 218; 702/186; 434/61, 219, 362; 706/45, 46; 717/170

(56) References Cited

U.S. PATENT DOCUMENTS

| | | | | |
|---|---|---|---|---|
| 3,903,613 | A * | 9/1975 | Bisberg ........................ 434/61 |
| 5,597,312 | A * | 1/1997 | Bloom et al. ................ 434/362 |
| 6,033,226 | A * | 3/2000 | Bullen ......................... 434/219 |
| 6,446,120 | B1 * | 9/2002 | Dantressangle ............. 709/224 |
| 6,522,995 | B1 * | 2/2003 | Conti et al. .................. 702/186 |
| 6,553,412 | B1 * | 4/2003 | Kloba et al. ................. 709/219 |
| 6,567,848 | B1 * | 5/2003 | Kusuda et al. ............... 709/219 |
| 6,567,849 | B2 * | 5/2003 | Ludovici et al. ............. 709/223 |
| 6,615,258 | B1 * | 9/2003 | Barry et al. ................. 709/223 |
| 6,654,800 | B1 * | 11/2003 | Rieger, III ................... 709/223 |
| 6,664,978 | B1 * | 12/2003 | Kekic et al. ................. 345/733 |
| 6,697,849 | B1 * | 2/2004 | Carlson ........................ 709/219 |
| 6,766,311 | B1 * | 7/2004 | Wall et al. .................... 706/46 |
| 6,782,374 | B2 * | 8/2004 | Nichols ........................ 706/45 |
| 2001/0029605 | A1 * | 10/2001 | Forbes et al. ................ 717/170 |
| 2001/0049741 | A1 * | 12/2001 | Skene et al. ................. 709/232 |
| 2002/0124055 | A1 * | 9/2002 | Reisman ...................... 709/218 |

* cited by examiner

Primary Examiner—Kevin J. Teska
Assistant Examiner—K Thangavelu
(74) Attorney, Agent, or Firm—Thomas, Kayden, Horstemeyer & Risley

(57) ABSTRACT

Methods and systems for demonstrating a service that provides a computerized transaction to a client via a server coupled to a computer network. One aspect of the invention is a method for demonstrating a virtual server service using a host server system over a computer network. A particular embodiment of the method can comprise receiving a first request from a prospective client via a prospective client system to demonstrate the virtual server service. This embodiment of the method can include sending a simulated control window of the virtual server service via a host server system to the prospective client system in response to the first request. The simulated control window can have a plurality of demonstration components that simulate corresponding system administration components of an active control window that active clients use to configure the virtual server service. The simulated control window does not require establishing an active trial account, but the prospective client can still navigate through a series of pages and input hypothetical data as though operating an actual control window of the virtual server service. The prospective client can accordingly experience the look and feel of the actual control window for the virtual server service without consuming computer resources or administration resources required to establish, maintain and clean an active trial account for each prospective client.

34 Claims, 15 Drawing Sheets

METHOD AND SYSTEM OF DEMONSTRATING A SERVICE THAT PROVIDES COMPUTERIZED TRANSACTIONS USING A COMPUTER NETWORK

TECHNICAL FIELD

The present invention generally relates to demonstrating at least a portion of a computer transaction on a computer network.

BACKGROUND

The Internet is used to conduct "electronic commerce" because it facilitates electronic communications between vendors and purchasers. The Internet comprises a vast number of computers and computer networks that are interconnected through communication channels. The term "electronic commerce" refers generally to commercial transactions that are at least partially conducted using the computer systems of the parties to the transactions. A purchaser, for example, can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce and the ability to profitably market merchandise. If electronic commerce can be easily conducted, then even novice computer users will be more likely to engage in electronic commerce. Additionally, if merchants and vendors can sell items for the highest price that the market will bear, then more merchants are likely to use electronic commerce. Therefore, it is important to develop techniques that facilitate conducting electronic commerce.

The Internet facilitates conducting electronic commerce, in part, because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies a particular URL for a specific web page and a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a special purpose application program (e.g., a "browser") that effectuates the requesting of web pages and the displaying of web pages.

Web pages are generally defined using HyperText Markup Language ("HTML"). HTML provides a standard set of tags that define how a web page is to be displayed. An HTML document, for example, contains various tags that control the text display, graphics, controls, and other features. The HTML document may also contain URLs of other web pages that are available on that server computer system or other server computer systems. When a user indicates to the browser to display a web page, the browser sends a request to the server computer system to transfer to the client computer system an HTML document that defines the web page. When the requested HTML document is received by the client computer system, the browser displays a web page as defined by the HTML document.

The WWW portion of the Internet is especially useful for conducting electronic commerce. Many web servers have been developed through which vendors can advertise and sell products. The products can include items that can be delivered electronically to the purchaser over the Internet (e.g., music). The products can also include other items (e.g., books, clothes and electronics equipment) that can be delivered through conventional distribution channels (e.g., common carriers). A vendor server computer system may provide an electronic version of a catalogue that lists the items that are available for purchase. A potential buyer may browse through the catalogue using a browser, and then the buyer can select various items that are to be purchased. When such a user has completed selecting the items to be purchased, the vendor server computer system typically prompts the user for information to complete the transaction. This purchaser-specific order information may include the purchaser's name, payment information (e.g., credit card number), and a shipping address. The vendor server computer system typically confirms the order by sending a confirming web page and/or an electronic mail message to the client computer system, and then the vendor server system schedules the shipment of the items.

Web servers for the WWW can be expensive to maintain and operate. As such, one computer service is a web host that leases processing and memory capacity of a "host server" to resellers, Internet Service Providers (ISPs), and businesses. Resellers typically lease a large amount of processing and memory capacity from the web host, and they resell their "portion" of the host server to ISPs or businesses for their web sites. Many resellers generally configure and reconfigure their portion of the host server so that they can efficiently deliver their services to their customers. For example, HOSTPRO is a web host that leases services on a host server to multiple users or resellers. The resellers can configure their portion of the host server via the WWW. HOSTPRO, more specifically, provides users and resellers with a control window that has a plurality of graphical interfaces that the users and resellers can use to configure a "virtual server service" provided by the host server.

One drawback of providing a web host service to multiple users and resellers is that it is costly and time-consuming to provide an accurate demonstration of the virtual server service to prospective customers. In a typical application, a web host generally requires potential resellers to establish an active trial account for demonstrating the virtual server service, and the web host may even charge the prospective users and resellers for the trial accounts. After establishing a trial account, a prospective user or reseller can use a control window to experience configuring the virtual server service via a graphical interface. By establishing an active trial account, a prospective customer uses the computer resources and generates data that is saved by the server. The web host must accordingly monitor, identify and remove any features that the prospective customers saved in their trial accounts. Providing such trial accounts for prospective customers accordingly consumes a significant amount of the computer resources at the host server and requires a significant amount of administration. In some instances, the host server may even inadvertently delete or alter information in an active customer account. As a result, demonstrating the control window for configuring a virtual server service using active trial accounts is inefficient and can result in inadvertently altering valuable information for active customer accounts.

SUMMARY

The present invention is directed toward demonstrating a service that provides a computerized transaction to a client via a server coupled to a computer network. One aspect of the invention is a method for demonstrating a virtual server service using a host server over a computer network. A particular embodiment of the method can comprise receiving a first request from a prospective client via a prospective client system to demonstrate the virtual server service. This embodiment of the method can include sending a simulated control window of the virtual server service via a host server system to the prospective client system in response to the first request. The simulated control window can have a plurality of demonstration components that simulate corresponding system administration components of an active control window that active clients use to configure the virtual server service. The simulated control window does not require establishing an active trial account, but the prospective client can still navigate through a series of pages and input hypothetical data as though operating an actual control window of the virtual server service. The prospective client can accordingly experience the look and feel of the actual control window for the virtual server service without consuming computer resources or administration resources required to establish, maintain and clean an active trial account for each prospective client.

DETAILED DESCRIPTION OF THE ILLUSTRATED EMBODIMENTS

The following disclosure describes several methods and systems that enable a prospective client to view and manipulate a demonstration of a virtual server service, or another type of computerized transaction, over the Internet using the World Wide Web. The term "virtual server service" means the portion of a host server system of a web host that a reseller or another type of client can configure and operate in a manner similar to a stand-alone server. Several embodiments of methods and systems in accordance with the invention are described below with reference to demonstrating a virtual server service that provides use of a host server system to a plurality of clients over a computer network. It will be appreciated, however, that the invention can have other applications for demonstrating a service that provides other types of computerized transactions using the World Wide Web. A person skilled in the art will accordingly understand that the invention may have additional embodiments, or that the invention may be practiced without several of the specific features described below.

FIGS. 1A–1L illustrate web pages of a demonstration module for demonstrating a virtual server service to a prospective reseller or another type of prospective client without establishing a trial account dedicated to the prospective client. The prospective client can experience the look and feel of configuring the virtual server service, but the prospective client does not generate information that instructs the host server system to configure an active trial account. As such, the interaction of the prospective client and the demonstration module does not consume significant resources of the host server or require administration resources. The web pages shown in FIGS. 1A–1L illustrate one type of graphical user interface or message that can be used to demonstrate the virtual server service, but it will be appreciated that other types of electronic messages could be used in other embodiments.

Figure 1A:
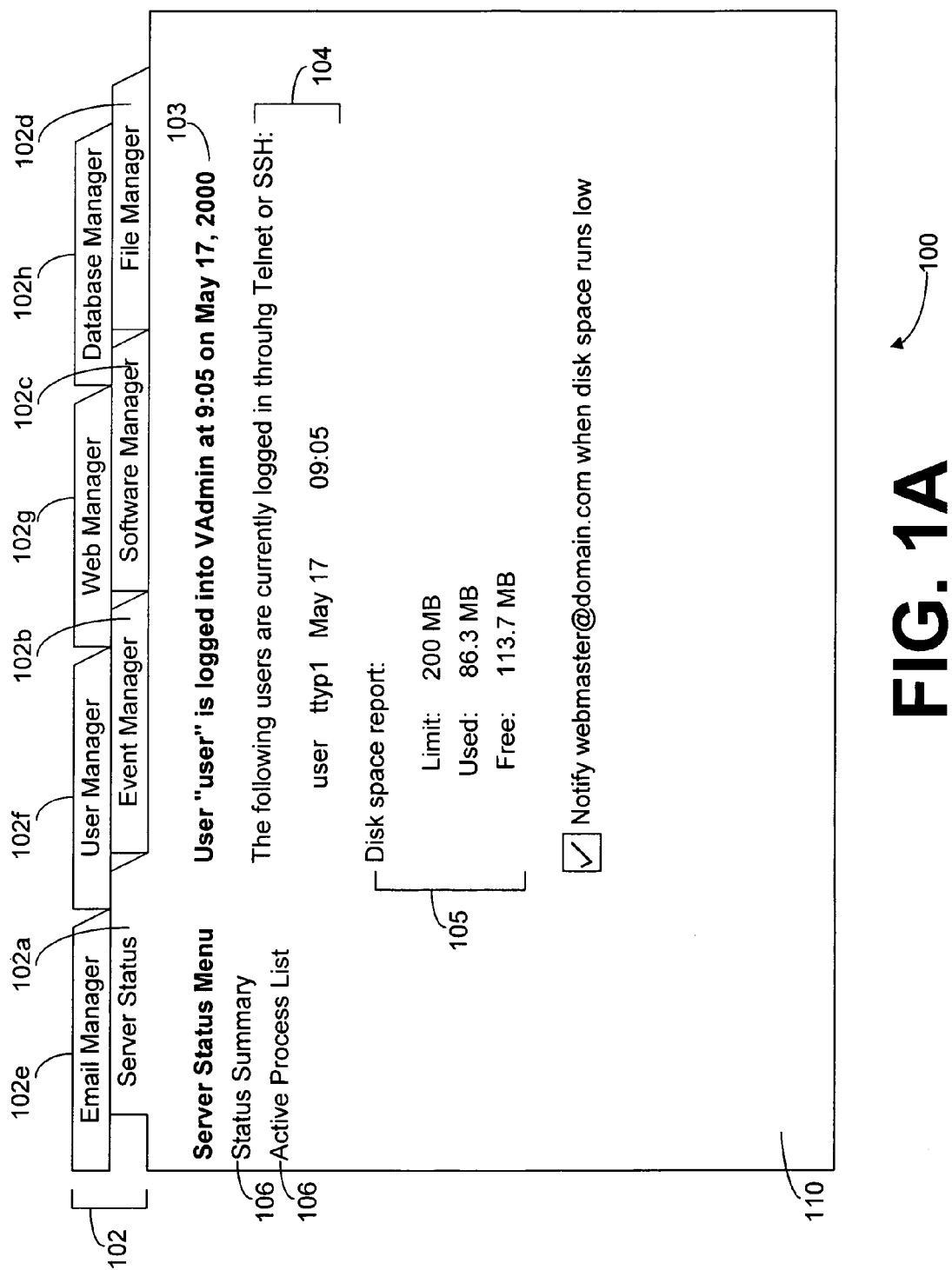
FIGS. 1A–1L are illustrations of web pages for demonstrating a virtual server service using a simulated control window via the World Wide Web in accordance with one embodiment of the invention.

Referring to FIG. 1A, the demonstration of the virtual server service provides a control window 100 having a plurality of demonstration components 102$a$–$h$ that provide links to a plurality of web pages. The control window 100 is sent from a host server system for the virtual server service to a prospective client system in response to a request from the prospective client to participate in a demonstration of the virtual server service. The request from the prospective client system is generally an HTTP request with a URL that, when sent to the host server, causes the host server to send the control window 100 to the client system. It will be appreciated that conventional systems for requesting and providing information over the Internet using the World Wide Web are suitable for doing so with the demonstration control window 100 of FIG. 1A.

The demonstration components 102$a$–$h$ of the control window 100 can be tabs that include a server status component 102$a$, an events manager component 102$b$, a software manager component 102$c$, a file manager component 102$d$, an email manager component 102$e$, a user manager component 102$f$, a web manager component 102$g$, and a database manager component 102$h$. The various demonstration components 102$a$–$h$ of the control window 100 can be omitted, rearranged or adapted in various ways. In general, the demonstration components 102$a$–$h$ of the control window 100 should correspond to system administration components of an actual control window for the virtual server service that active clients use to configure their portion of the virtual server service. The demonstration components 102$a$–$h$ are thus replicas of tools for controlling an active control window.

When the prospective client requests a demonstration of the virtual server service, the client system sends a message to the host server system requesting that the control window 100 be displayed at the client system. The host server system can initially send the client system a server status page 110 of the control window 100. The status page 110 can include the server status component 102$a$, which can be a URL link to access the server status page 110 from other pages of the control window 100. In this embodiment, the server status page 110 displays an example of the status of a virtual server account. The server status page 110 generally provides a login time 103 corresponding to the time that the host server system sent the server status page 110 to the client system, a current user field 104, a disk space report field 105, and a plurality of other links 106. The layout and information on the server status page 110 can be identical to that of a server status page for an actual control window of an active account.

The control window 100 also allows the prospective client to navigate to other web pages of the demonstration module by selecting the particular demonstration components 102*a–h*. Each of the demonstration components 102*a–h* can thus be URL links that, when selected, cause the host server system to send a corresponding page to the client server system. To view the web pages of the demonstration module for the email manager, for example, the prospective client selects the email manager component 102*e*. The host server accordingly sends a new web page corresponding to the selected email manager page of the demonstration module to the client system.

Figure 1B:
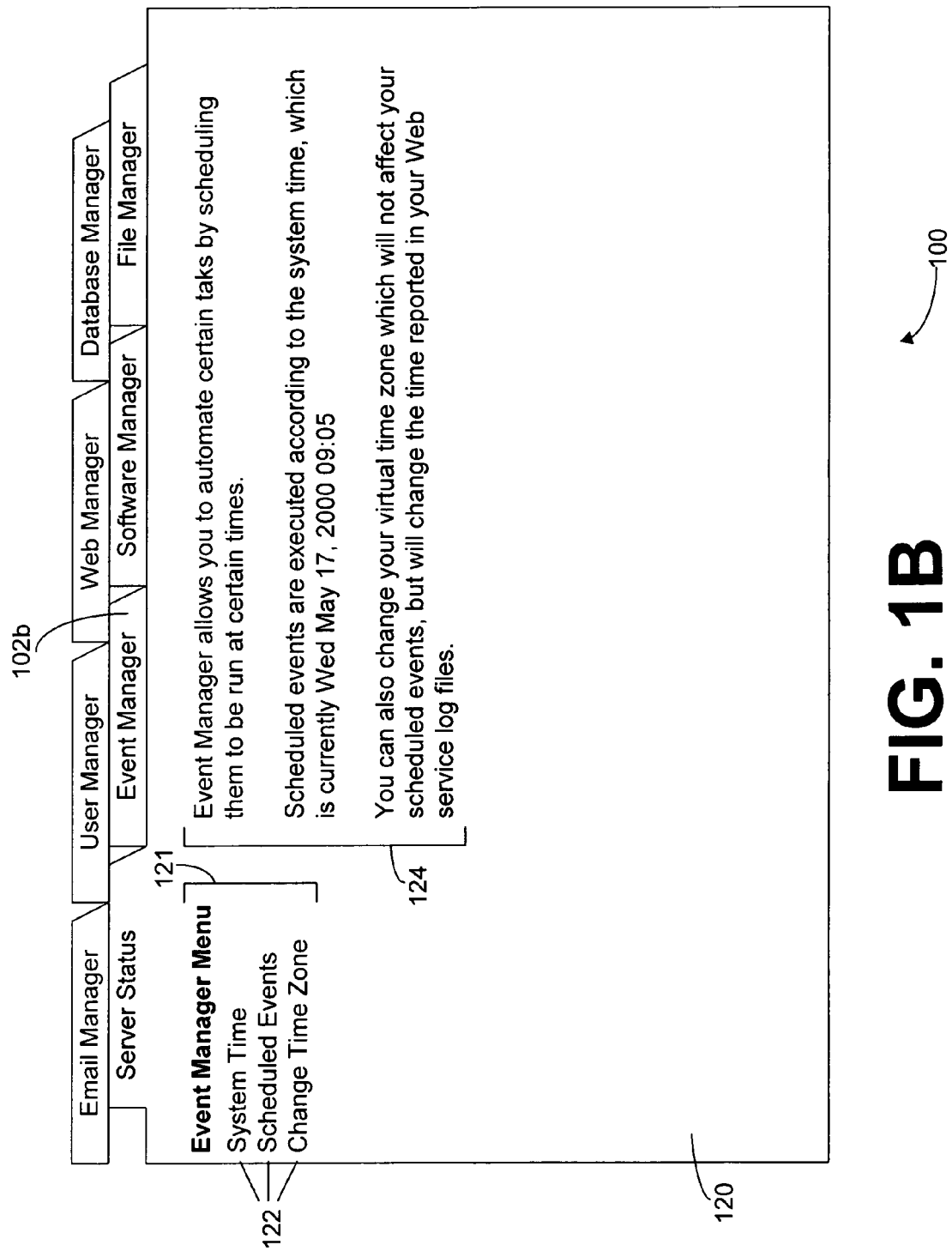

FIG. 1B illustrates an example of a display of an event manager page 120 of the demonstration module of the virtual server service. The event manager page 120 is another page of the control window 100. When a prospective client selects the event manager component 102*b* from any other page of the control window 100, the host server system sends the event manager page 120 to the client system. The event manager page 120 can include an event manager menu 121 having a number of elements 122 for retrieving additional web pages from the host server system. The elements 122, for example, can be URL links that instruct the host server to send the selected web pages to the client system. The web pages accessed from the event manager page 120 simulate the web-based graphical interface that an active client of the virtual server service would use to configure an active account. The web pages associated with the elements 122 can thus contain specific functions and actions that the prospective client can view and manipulate to experience the look and feel of the event manager unit of the control window 100. The elements 122 can also be dummy links that appear to be links as the cursor is placed over the elements 122, but do not cause the host server to display additional web pages at the client system. The event manager page 120 can further include a description 124 explaining the various actions and functions of the event manager unit. The description 124 may be used only on the demonstration module and not on the actual control window for active accounts.

Figure 1C:
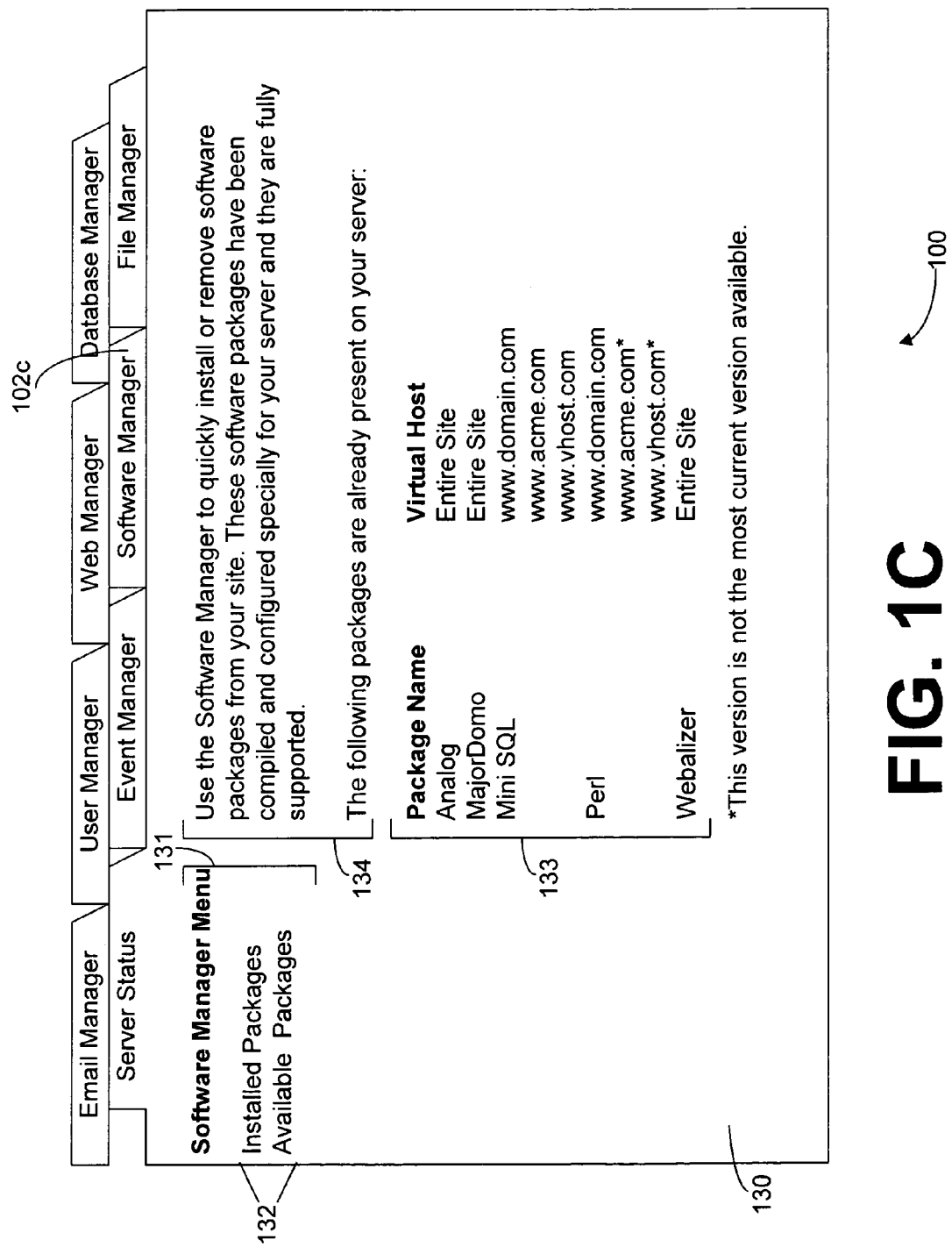

FIG. 1C illustrates an example of a display of a software manager web page 130 from the host server system. When the prospective client selects the software manager demonstration component 102*c* from any page of the control window 100, the host server system sends the software manager web page 130 to the client system. In this embodiment, the software manager page 130 is a replica of a hypothetical software manager page for the actual control window of an active account. The software manager web page 130 can include a software manager menu 131 having a plurality of elements 132, a list 133 of software packages that are hypothetically installed on the prospective client's virtual server, and a description 134 of the software manager unit. The elements 132 of the software manager menu 131 can be URL links that instruct the host server system to send additional web pages regarding the software package unit to the client system.

Figure 1D:
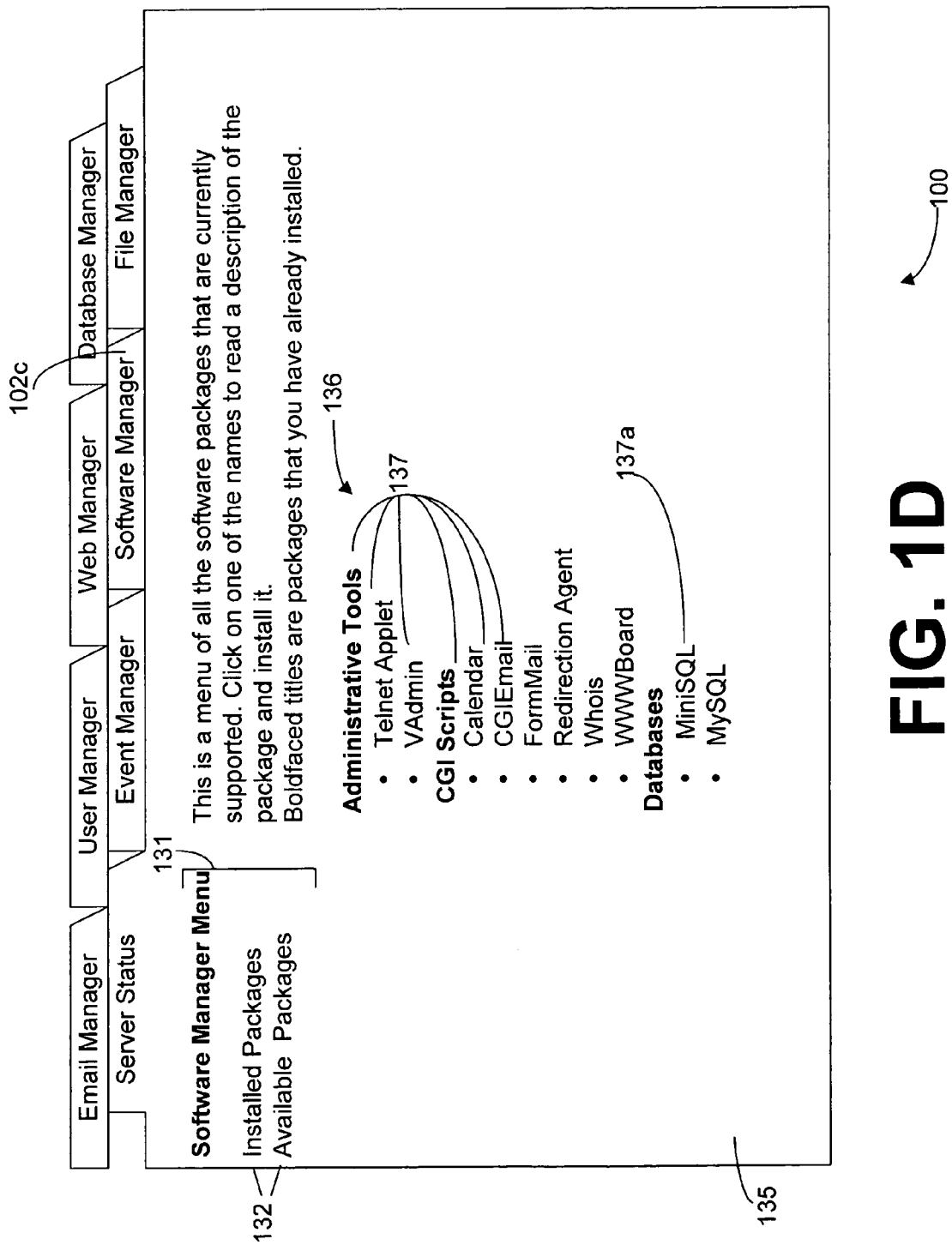
Figure 1E:
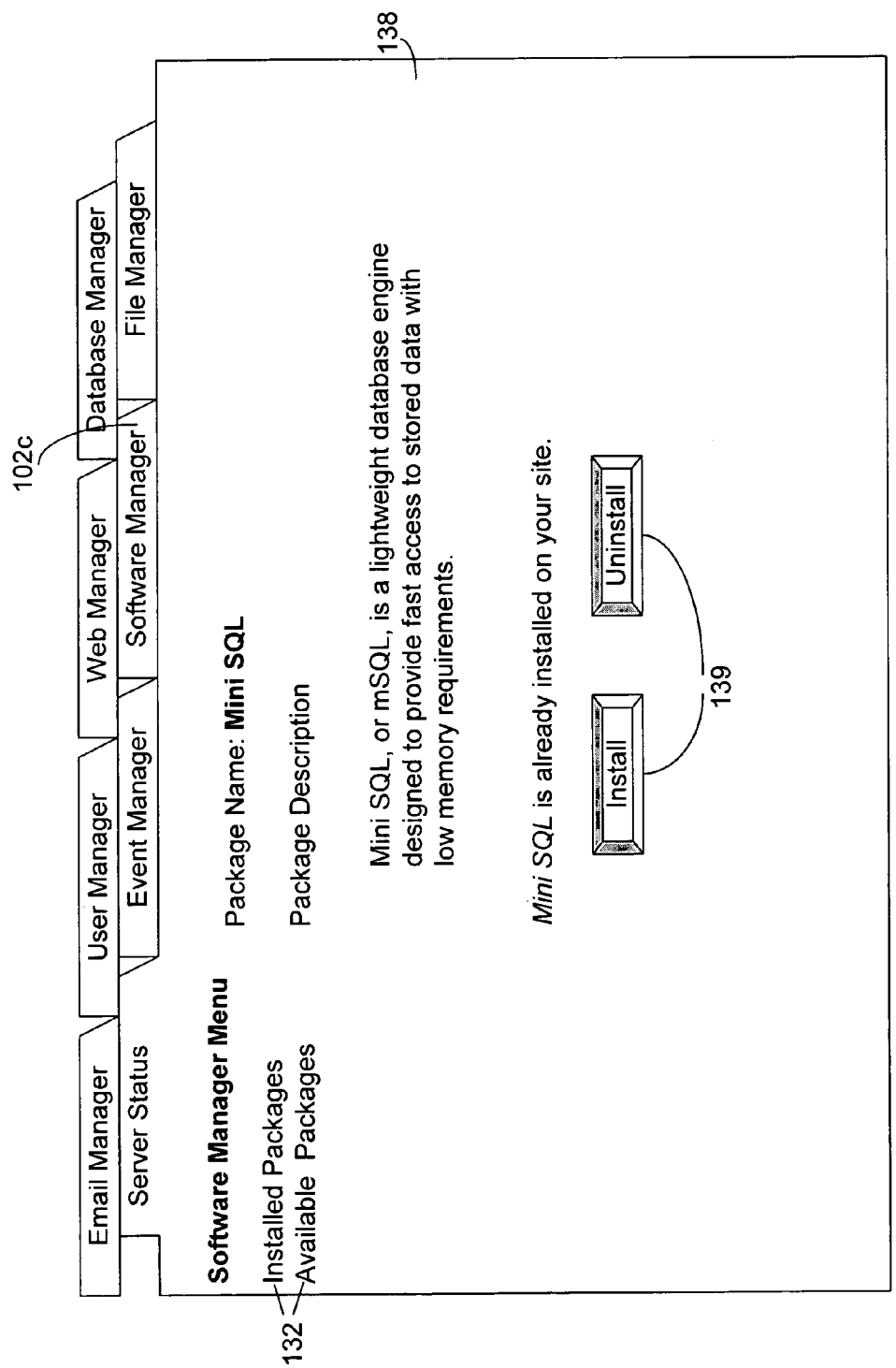
Figure 1F:
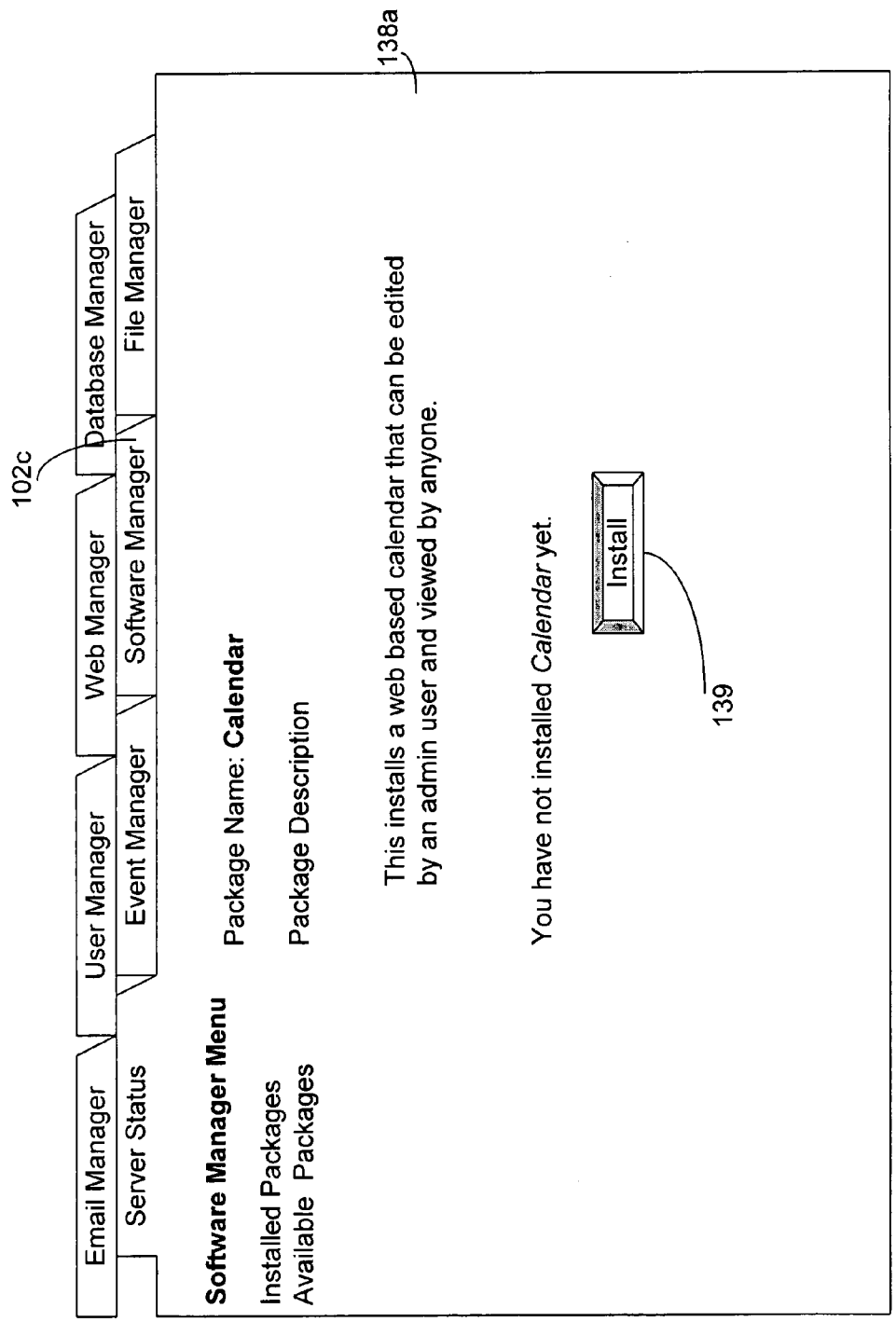

FIGS. 1D–1F illustrate several web pages related to the software management unit of the virtual server service. FIG. 1D, for example, illustrates a second software manager web page 135 that the host server system displays on the client system when the prospective client selects the element 132 for the "Available Packages." The second software manager web page 135 can include a second list 136 of the available software packages for the virtual server service. Each of the titles 137 in the second list 136 can be a link for instructing the host server system to send additional web pages regarding the selected software package to the client system. For example, if the prospective client selects the element 137*a* for the "Mini-SQL" software package, the host server system will send a third software manager web page 138 (shown in FIG. 1E) to the client system. The third software management web page 138 can include a description of the particular software package and a status report that the software package is already installed on the prospective client's virtual server. The third software manager web page 138 can also include a plurality of actuators 139 for installing or uninstalling a hypothetical software package on the prospective client's virtual server.

FIG. 1F illustrates an example of a fourth software web page 138*a* for the software package entitled "Calendar," which has not been installed on the prospective client's virtual server. The fourth web page 138*a* can also have a package description, a status report, and an actuator 139. It will be appreciated that the status reports on the software web pages 138 and 138*a* correspond to the list 133 of installed software packages on the software web page 135 shown in FIG. 1C. Referring to FIG. 1C, for example, the list 133 of installed software packages does not include the software package entitled "Calendar." The actuator 139 of the fourth software web page 138*a* shown in FIG. 1F can accordingly be selected to hypothetically install the software calendar package on the prospective client's virtual server. As such, the demonstration module can allow the prospective client to hypothetically install and uninstall software packages.

Figure 1G:
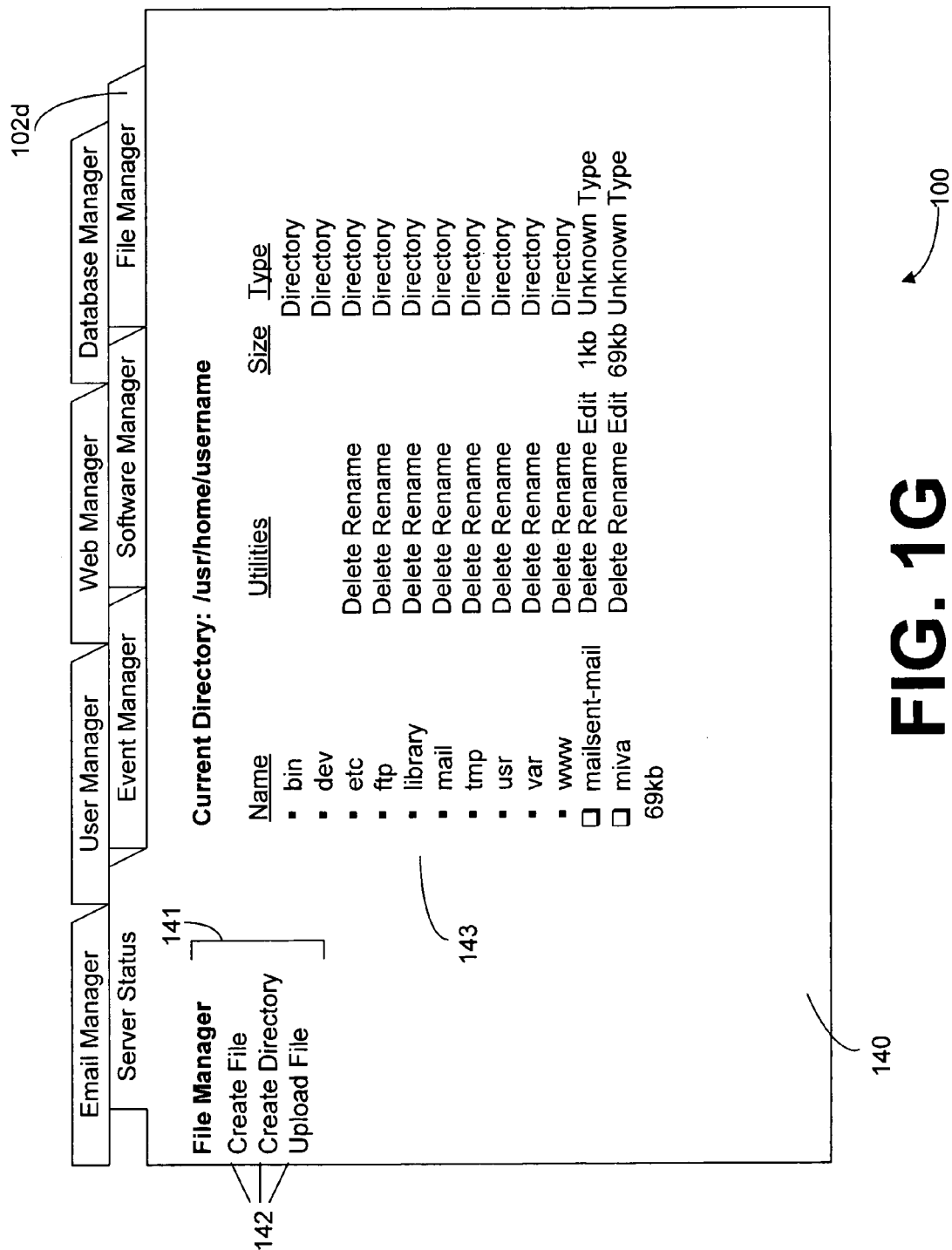

FIG. 1G illustrates an example of a display of a file manager web page 140 of the demonstration module for the virtual server service. When the prospective client selects the file manager demonstration component 102*d* from any page of the control window 100, the host server system sends the file manager web page 140 to the client system. The file manager web page 140 can contain a file manager menu 141 having a plurality of elements 142 for hypothetically managing the files of the virtual server service. The elements 142 can be URL links that cause the host server system to hypothetically create a file, create a directory and/or upload a file. The elements 142 of the file manager menu 141 simulate the functions of the file manager unit of the demonstration module. The file manager page 140 can also include a tree or other type of display showing the current files, directories and folders for a hypothetical user.

Figure 1H:
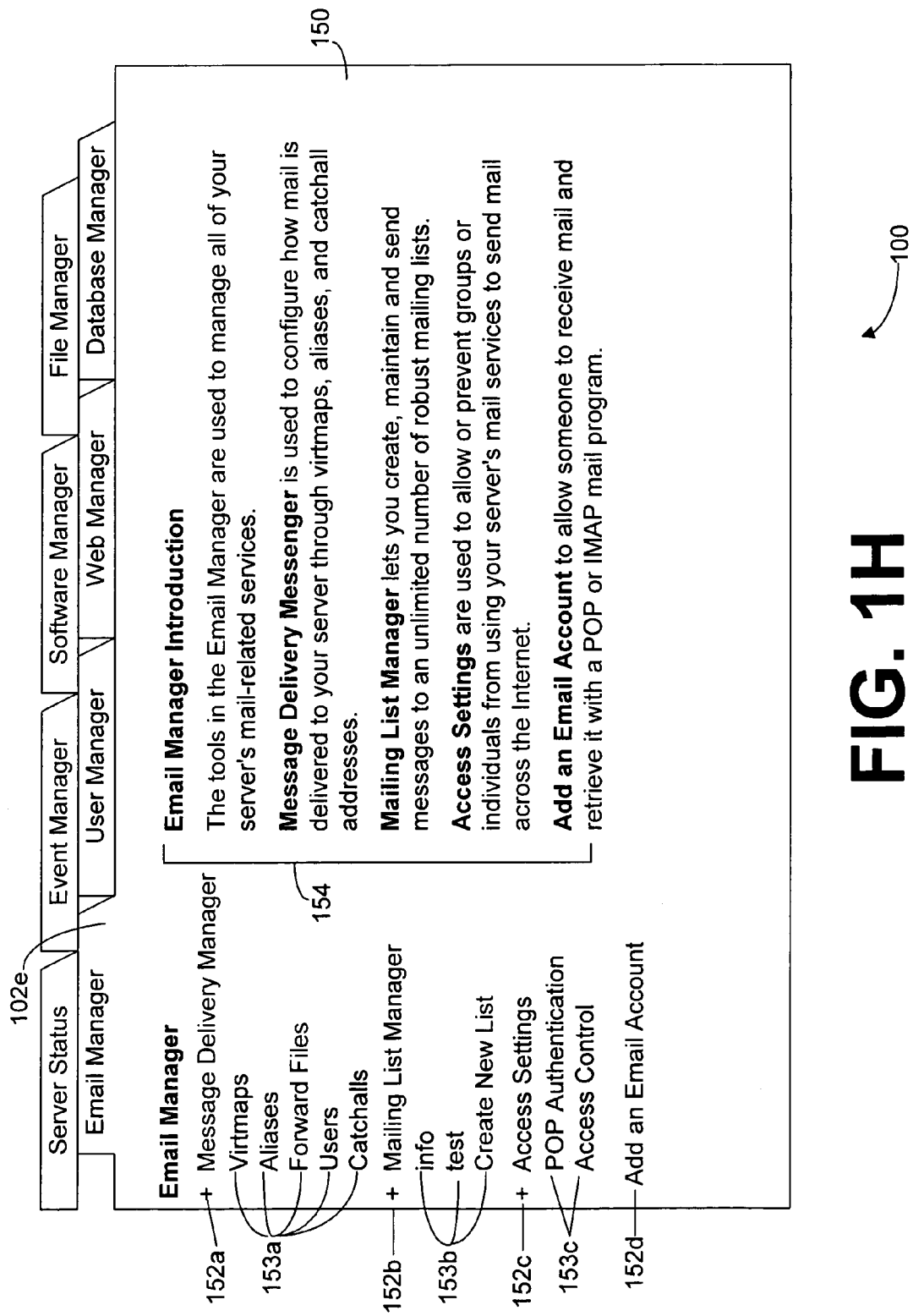

FIG. 1H illustrates an example of a display of an email manager web page 150 of the demonstration module for the virtual server service. When the prospective client selects the email manager demonstration component 102*e*, the host server system sends the email manager web page 150 to the client system. The email manager web page 150 can include a plurality of primary elements 152*a–d* and a plurality of secondary elements 153*a–c*. The primary elements 152*a–d* and the secondary elements 153*a–c* can be URL links to various web pages of the demonstration module for the virtual server service. The additional web pages of the email manager module can be identical to those found in the actual email manager module for active accounts. The email manager web page 150 can further include a description field 154 that describes the functions of the web pages associated with the primary elements 152*a–d*. The prospective client can select one of the primary elements 152*a–d* or one of the secondary elements 153*a–c* to experience configuring the email manager of the virtual server.

Figure 1I:
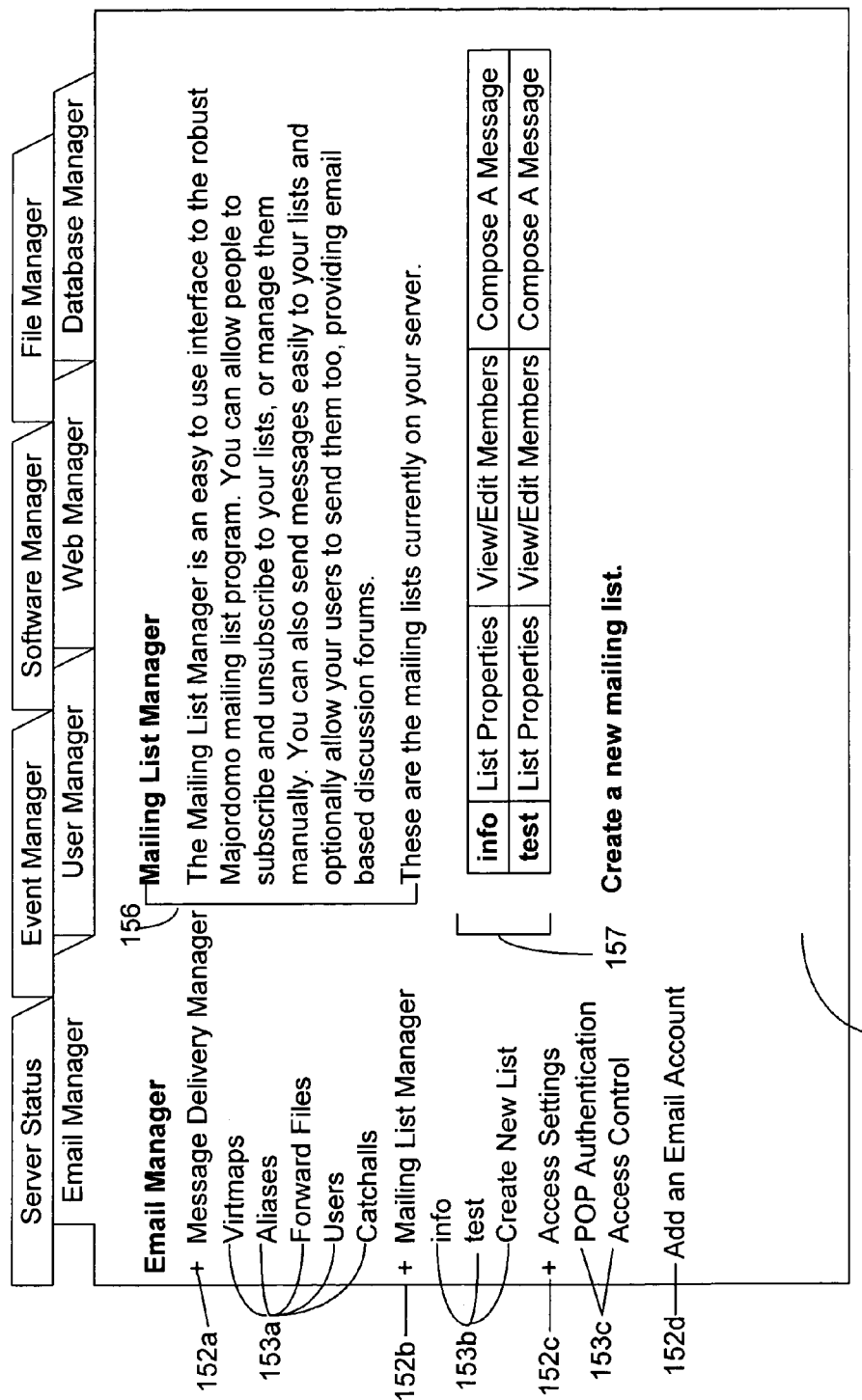

FIG. 1I illustrates a second email manager web page 155 of the email manager unit. When the client selects the element 152*b* for the "Mailing List Manager" from the primary email manager web page 150, the host server sends the second email manager web page 155 to the client system. The second email manager web page 155 can include a description 156 of the mailing list manager and a hypothetical status table 157. The prospective user can manipulate the features of the hypothetical status table 157 to experience the feel of managing the users of the email system for the virtual server.

Figure 1J:
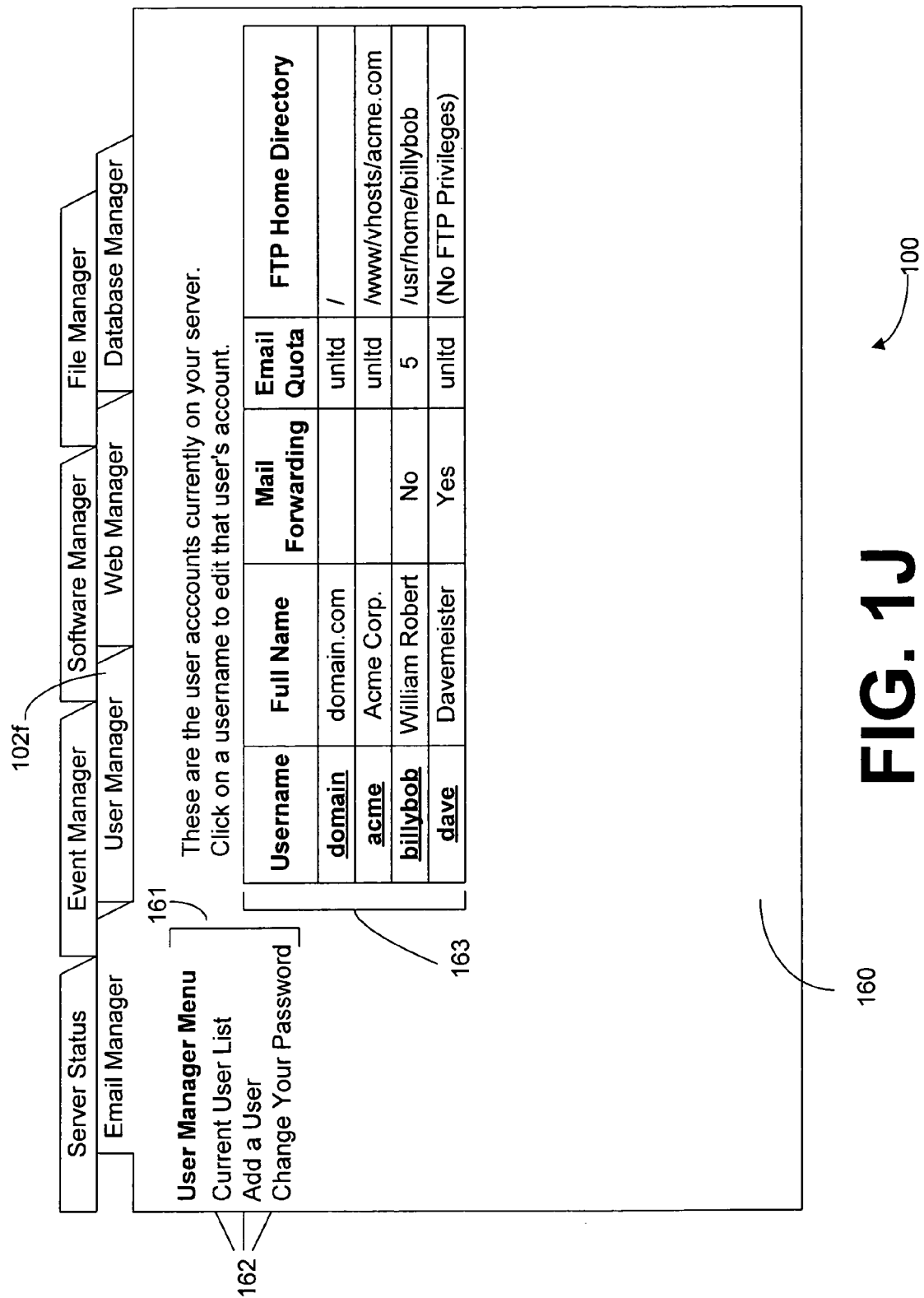

FIG. 1J illustrates an example of a display of a user manager web page 160 of the demonstration module for the virtual server service. When a prospective client selects the user manager demonstration component 102*f* from any page of the control window 100, the host server system sends the user manager web page 160 to the client system. The user manager web page 160 can include a user manager menu 161 having a plurality of elements 162. The elements 162 can be URL links that the prospective client selects to experience additional web pages related to the user manager unit of the demonstration module. The prospective client, for example, can select to view the current user list, to add a user to the list, or change the password for the client. The user manager page 160 can also include a user table 163. In the embodiment shown in FIG. 1J, the user table 163 illustrates a reseller application in which the users include an ISP (domain.com), a web site for a corporation (Acme Corporation), and two individual users (billy bob and dave). The prospective client can review the information on the user manager menu 160 to experience the look and feel of configuring the user parameters for the virtual server service.

Figure 1K:
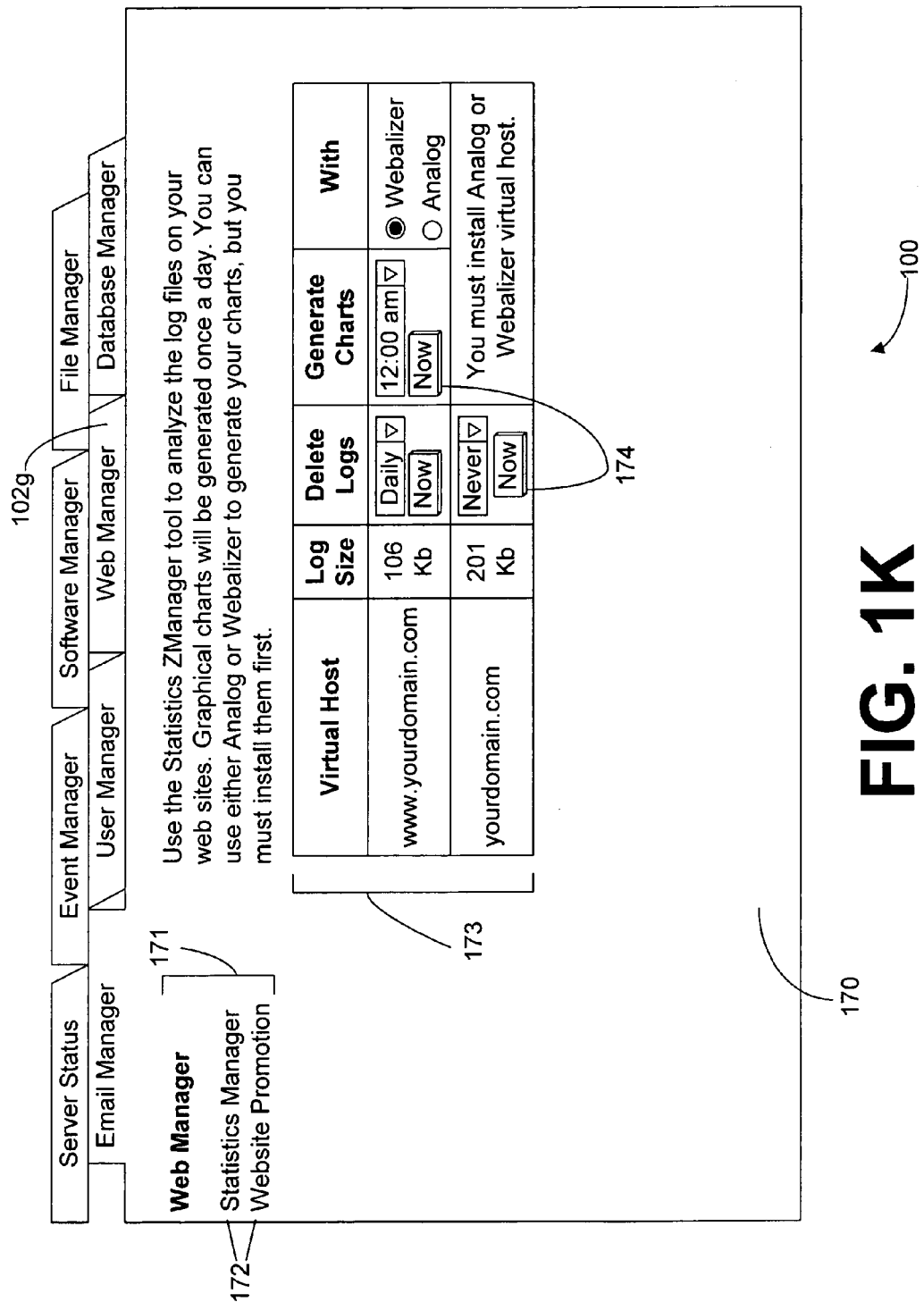

FIG. 1K illustrates an example of a display of a web manager page 170 from the host server system. When the prospective client selects the web manager demonstration component 102*g*, the host server system sends the web manager page 170 to the client system. The web manager page 170 can include a web manager menu 171 having a plurality of elements 172 that the prospective client can select to experience the look and feel of operating the web manager for the virtual server. The web manager page 170 can further include a web manager table 173 for inputting hypothetical data regarding the configuration of the virtual server. The web manager table 173, for example, can include a plurality of pull-down menus 174 that the prospective user can manipulate to experience the look and feel of operating the web manager unit of the virtual server service.

Figure 1L:
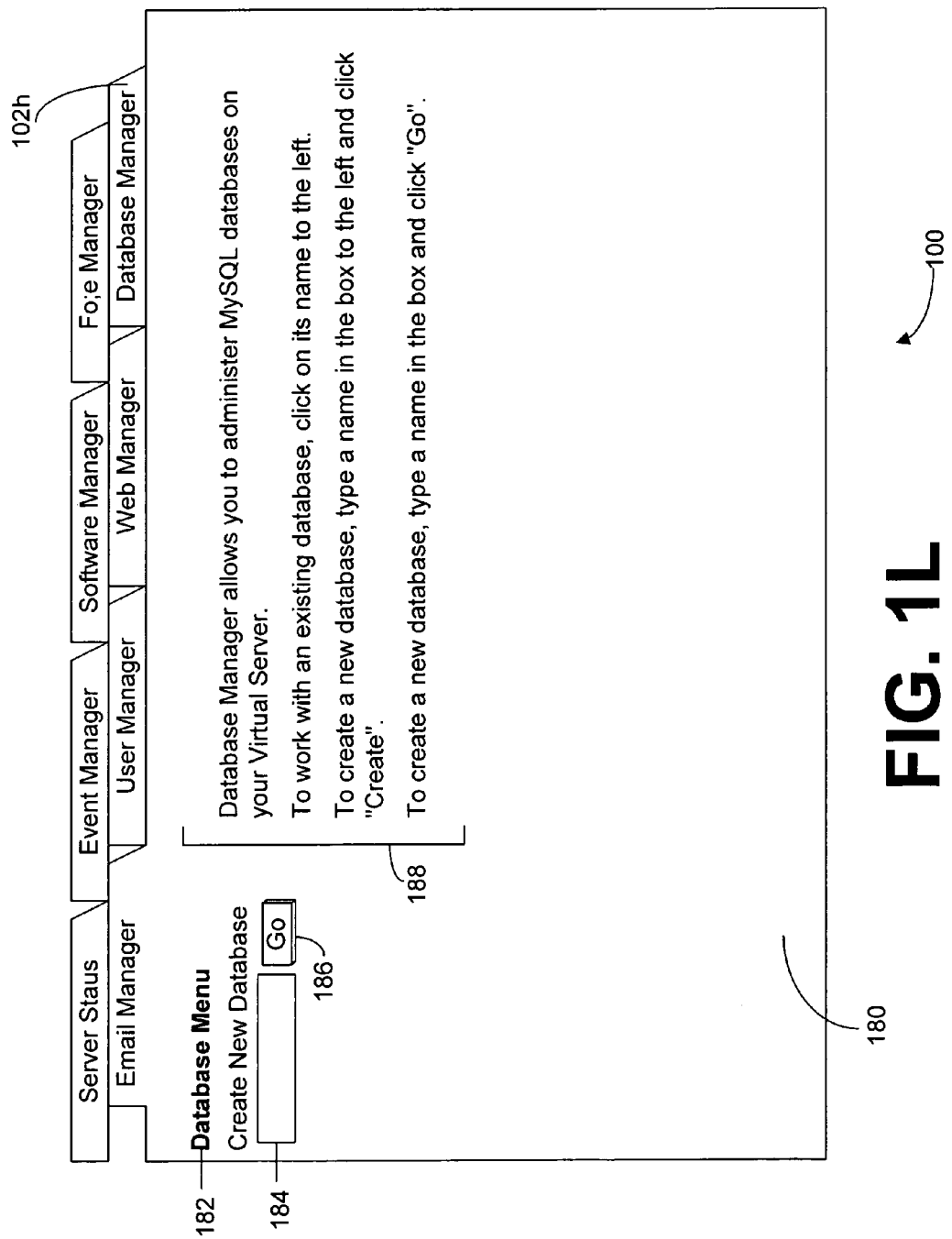

FIG. 1L illustrates an example of a display of a database manager web page 180 of the demonstration module for the virtual server service system. When the prospective client selects the database manager demonstration component 102*h* from any page of the control window 100, the host server system sends the database manager page 180 to the client system. The database manager page 180 can include a database menu 182, an input field 184, an element 186 for creating a new database, and a description section 188. The prospective user can manipulate the database menu 182 and the input field 184 to experience the look and feel of operating the database manager unit of the virtual server.

FIGS. 1A–1L illustrate several embodiments of methods for demonstrating a virtual server service. The various components, elements, input fields and pull-down menus of the web pages 110–180 can be tools that correspond to the same tools of an administration control window for use by active clients to configure their virtual server services. The web pages 110–180, however, are not active web pages because the host server system does not need to store and administer the settings that the prospective client selects or the data that the prospective client inputs. The actions of the prospective client accordingly do not require the computer resources that are necessary to operate active trial accounts for prospective customers. Moreover, the actions of the prospective client do not need to be monitored and deleted from the host server after completing the demonstration. As a result, the demonstration module that generates the demonstration web pages 110–180 mitigates the potential for inadvertently deleting valuable information of an active client that can occur when data is deleted from an active trial account. Therefore, several embodiments of the methods for demonstrating a virtual server service set forth in FIGS. 1A–1L are expected to reduce the costs and errors involved with demonstrating a computerized service compared to providing an active trial account to prospective clients.

Figure 2:
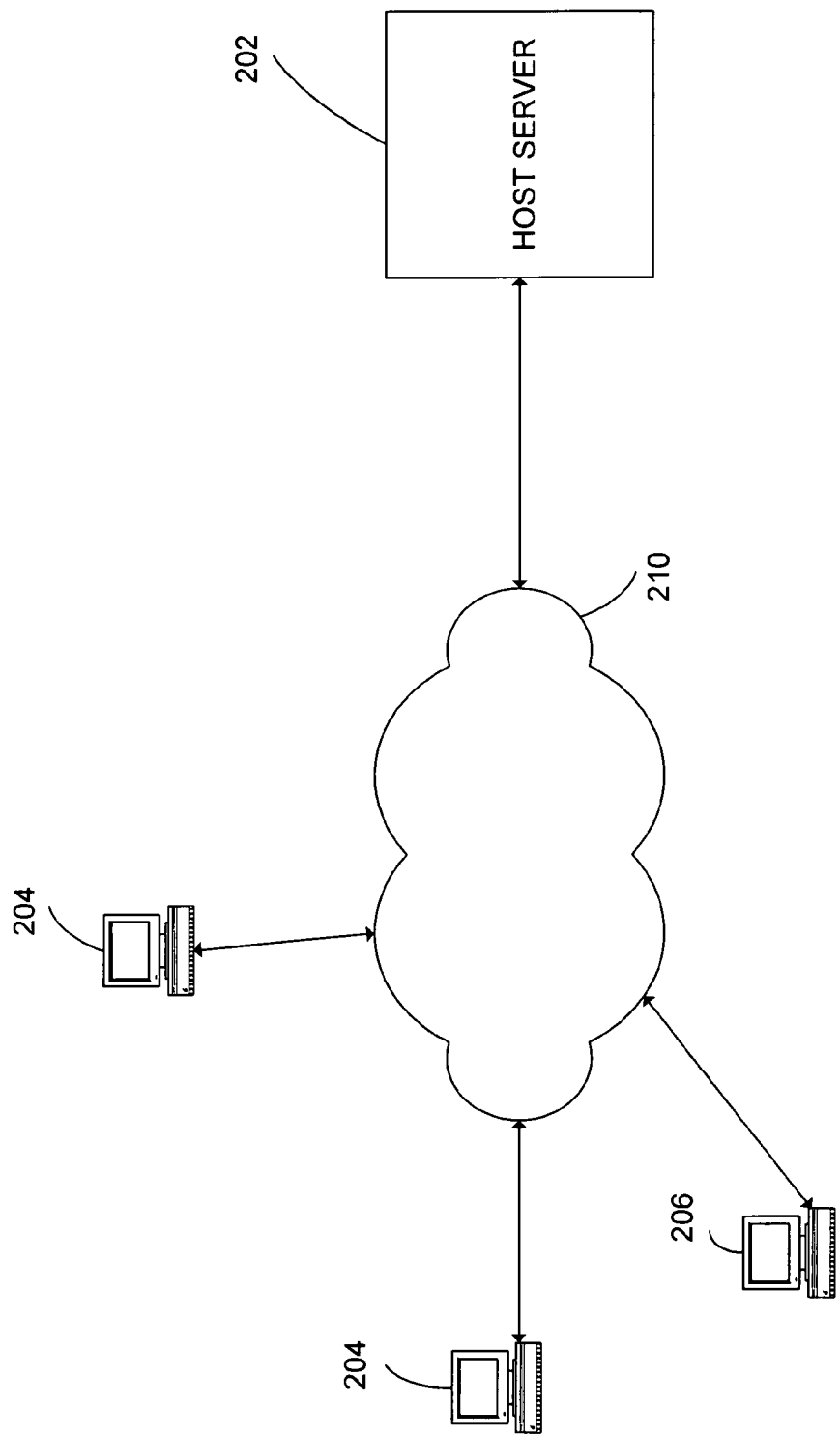
FIG. 2 is a schematic illustration of an arrangement using an embodiment of the invention that supports demonstrating a virtual server service using a simulated control window over the Internet using the World Wide Web.

FIG. 2 is a schematic illustration of an arrangement for implementing any of the embodiments described above for supporting a demonstration of a virtual server service over the Internet using the World Wide Web. In this embodiment, the arrangement includes a host server system 202, one or more client systems 204, and a prospective client system 206 that are all connected to the Internet 210. Any of the procedures explained above with reference to FIGS. 1A–1L can be carried out using the host server system 202, at least one of the client systems 204, and the prospective client system. As described in more detail below, the demonstration of the virtual server service can also be used in various environments other than the Internet. For example, the prospective client can view graphical interface materials using an electronic mail environment in which the web pages and the actions that can be performed using the web pages are described in an electronic mail message along with graphical attachments.

Figure 3:
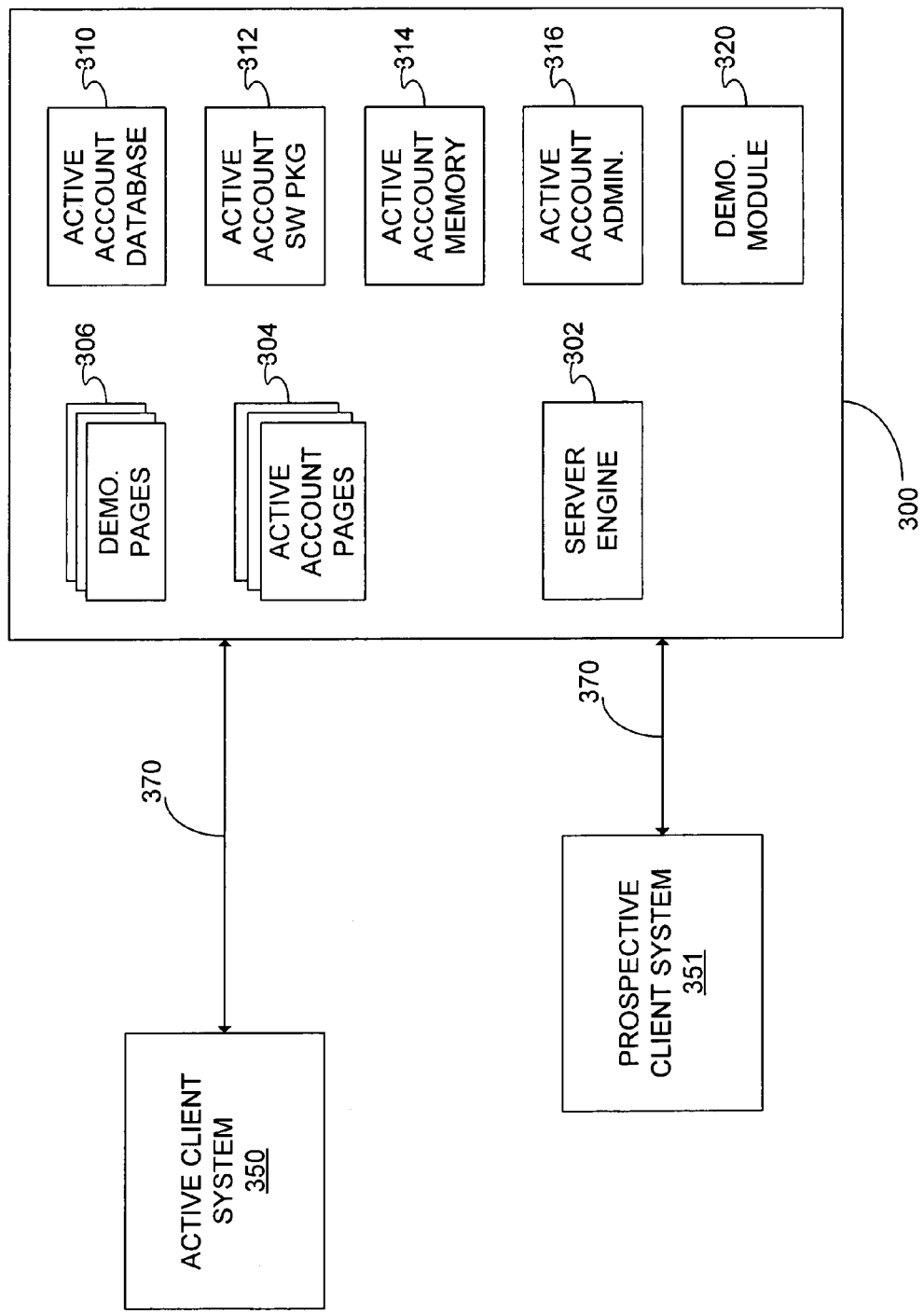
FIG. 3 is a block diagram of an embodiment of a host server system and a client system that supports demonstrating a virtual server service using a simulated control window over the Internet using the World Wide Web.

FIG. 3 is a block diagram illustrating an embodiment of a host server system that supports demonstrating a virtual server service and providing an active virtual server service over the Internet using the World Wide Web. This embodiment includes a host server system 300, an active client system 350, and a prospective client system 351. The host server system 300 can include a server engine 302, various active account web pages 304, and various demonstration web pages 306. The host server system 300 can further include an active account database 310, an active account software package unit 312, a memory 314, and an active account administration unit 316. The server engine 302 receives HTTP requests to access the active account pages 304 identified by URLs, and the server engine 302 provides the requested active account pages 304 to active clients. The active account database 310 contains the information of the active accounts, and the active accounts software package module unit 312, the active account memory 314, and the active account administration unit 316 can be administered by an active client via the server engine 302 and the client system 350.

The host server system 300 can further include a demonstration module 320 for operating the demonstration pages 306. The server engine 302 can receive HTTP requests from the prospective client system 351 to experience a demonstration of the virtual server service provided by the host server 300. The server engine 302 provides the requested demonstration web pages 306 for the various web pages of the control window 100 explained above with reference to FIGS. 1A–1L. The demonstration module 320 processes the various URLs selected by the prospective client system 351 to send the appropriate demonstration pages 306 to the prospective client system 351. In one embodiment, the demonstration module 320 does not necessarily store or otherwise retain data input by the prospective client system 351, and the demonstration module 320 does not require the server engine 302 to establish active trial accounts for the active account database 310, the active account memory 314, or the active account administration unit 316. In general, the prospective client system 351 can accordingly experience the look and feel of operating a virtual server service without requiring the server engine 302 to manipulate any of the active account aspects of the host server system 300.

The active account pages 304 and the demonstration pages 306 can be stored in a memory of the host server 300. Alternatively, the host server 300 can construct the active account pages 304 and the demonstration pages 306 from instructions and data stored on the host server 300 according each request from an active client or a prospective client.

The client system 350 and the prospective client system 351 can interact with the host server system 300 by exchanging information via communication links 370. The communication links 370 may include transmission over the Internet, but a person skilled in the art will appreciate that the demonstration techniques disclosed above can be used in various environments other than the Internet. For example, the demonstration procedure can also be performed by using an electronic mail environment in which the demonstration is described in an electronic mail message along with graphical attachments. Also, various communication channels may be used, such as local area networks, wide area networks, or point-to-point dial-up connections.

The host server system 300, the client system 350, and the prospective client system 351 can also comprise any combination of hardware or software that can manipulate the various active account web pages 304 and/or demonstration web pages 306. The host server system 300, for example, can be a high-speed system with a large memory and high-speed connections. The prospective client system 351 can comprise any combination of hardware or software that can interact with the host server system 300. The prospective client system 351, for example, may be a personal computer, a television-based system or various other products through which the demonstration module 320 and the server engine 302 can electronically place the demonstration pages 306 on the prospective client system 351.

Figure 4:
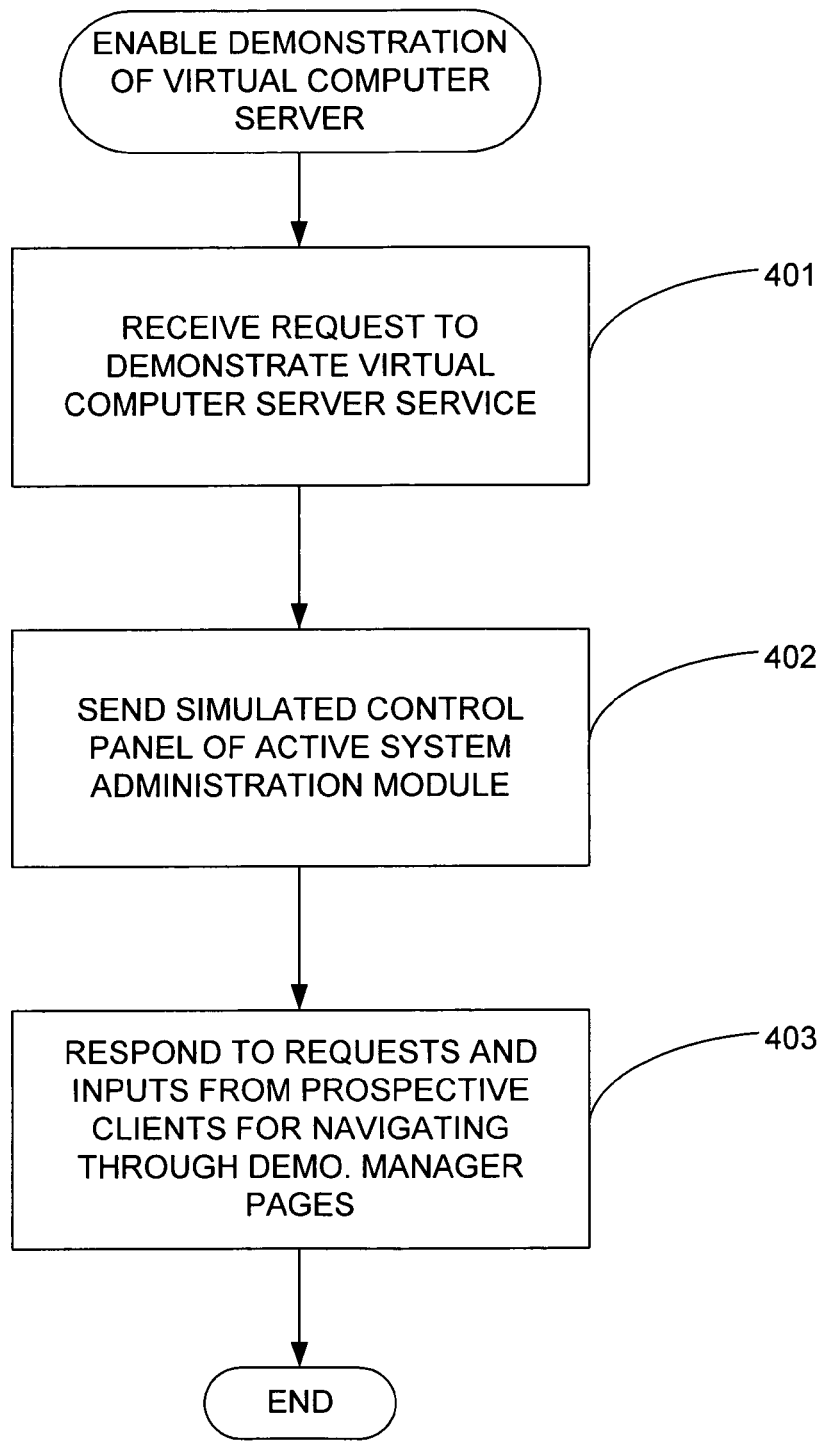
FIG. 4 is a flowchart of a routine for demonstrating a virtual server service using a simulated control window over the Internet using the World Wide Web.

FIG. 4 is a flow diagram of a routine that enables demonstration of a virtual server service via a host server system. To enable the demonstration routine, the host server system 300 (FIG. 3) needs to receive a request from the prospective client system 351 (FIG. 3) regarding a demonstration of the virtual server service. In procedure 401, for example, the host server system 300 receives a request from the prospective client system 351 to demonstrate the virtual server service. As explained above, the host server system 300 can obtain such a request in the form of an HTTP request via the Internet. In procedure 402, the host server system 300 transmits or otherwise sends a simulated control window to the prospective client system 351. The simulated control window can be similar to the control window 100 illustrated above with respect to FIGS. 1A–1L, but it will be appreciated that other control windows can be used. In procedure 403, the host server system responds to various requests and inputs from the prospective client system 351 for navigating through the demonstration web pages 306. The demonstration web pages 306 can be sent to the prospective client system 351 to display the various manager web pages 110–180 explained above with reference to FIGS. 1A–1L. After the prospective client has reviewed the various demonstration web pages 306, the demonstration routine can be terminated without storing or otherwise maintaining the specific input from the prospective client system 351.

Although various embodiments described above set forth the best mode of the invention in a manner that would enable a person skilled in the art to make and use these embodiments, it is not intended that the invention be limited to these embodiments. Modification within the spirit of the invention will be apparent to those skilled in the art. For example, the concept of providing a demonstration routine having demonstration web pages can be applied to other computerized transactions that are effectuated via a computer network. Additionally, another benefit of providing a separate interactive demonstration module that does not use active trial accounts is that unauthorized users are less likely to gain access to the live virtual server service. The embodiments of the virtual server service explained above accordingly provide enhanced security to the host server system. Therefore, the scope of the present invention is not limited except as defined only by the claims that follow.

What is claimed is:

1. A method of demonstrating a virtual server service that provides use of a host computer server to a plurality of clients over a computer network, the method comprising:

receiving an active request from an active client to send an active control window of an active account of the virtual server service from the host computer server to an active client system;

receiving a first request at the host computer server from a prospective client system to demonstrate the virtual server service; and under control of the host computer server, sending a simulated control window of the virtual server service to the prospective client system in response to the first request, the simulated control window having a plurality of demonstration components that simulate corresponding system administration components of the active control window of the virtual server service.

2. The method of claim 1, further comprising:

receiving a second request from the prospective client system after sending the simulated control window, the second request being a request to send a first systems manager page of a first demonstration component of the simulated control window; and sending the first systems manager page via the host computer server to the prospective client system in response to the second request, the first systems manager page having at least one first element that can be selected by the prospective client to request that the host computer server send another web page related to the first systems manager page.

3. The method of claim 1, further comprising:

receiving a second request from the prospective client system after sending the simulated control window, the second request being a request to send a first systems manager page of a first demonstration component of the simulated control window; and sending the first systems manager page via the host computer server to the prospective client system in response to the second request, the first systems manager page having at least one input field that the prospective client can input a hypothetical value for configuring the virtual server service.

4. The method of claim 1, further comprising:
receiving a second request from the prospective client system after sending the simulated control window, the second request being a request to send a first systems manager page of a first demonstration component of the simulated control window; and
sending the first systems manager page via the host computer server to the prospective client system in response to the second request, the first systems manager page having at least one pull down menu having a plurality a choices from which the prospective client can select a hypothetical value for configuring the virtual server service.

5. The method of claim 1 wherein the demonstration components of the simulated control window comprise a server status component, an event manager component, a software manager component, a file manager component, an email manager component, a user manager component, a web manager component, and a database manager component, and wherein the method further includes:
receiving a second request from the prospective client system after sending the simulated control window to the prospective client system, the second request being generated from the prospective client system by selection of one of the demonstration components; and
sending a selected systems manager page to the prospective client system in response to the second request, the selected systems manager page corresponding to the selected demonstration component.

6. The method of claim 5 wherein the event manager component is a URL link to an event manager web page comprising a first element for hypothetically selecting tasks to be automatically performed by the host computer server for the virtual server service, a second element for hypothetically running selected tasks at a scheduled time, and a third element for hypothetically changing a virtual time zone, and wherein sending a systems manager page comprises sending the event manager page to the prospective client.

7. The method of claim 5 wherein the software manager component is a URL link to a software manager web page comprising a first listing of hypothetically installed software packages, a second listing of hypothetically available software packages, a first element for hypothetically selecting the installed software packages, and a second element for selecting the available software packages, and wherein sending a systems manager page comprises sending the software manager page to the prospective client.

8. The method of claim 7, further comprising:
receiving a third request from the prospective client system to view a first software package page of a specific software package in response to the prospective client selecting the second element of the software manager page; and
sending the first software package page via the host computer server to the client system, the first software package page having a selector for hypothetically installing the specific software package.

9. A method of demonstrating a service that provides a computerized transaction to a plurality of clients via a server computer system coupled to a computer network, the method comprising:
receiving a first request from a prospective client via a prospective client system to demonstrate the computerized transaction; and
sending a simulated client interface to the client system via the computer server system in response to the first request, the simulated client interface having a plurality of demonstration components that simulate corresponding transaction components of an active client interface of the computerized service.

10. The method of claim 9 wherein the computerized transaction is providing a virtual server service via a host server system, and wherein:
receiving a first request comprises receiving a request to demonstrate the virtual server service; and
sending a simulated client interface comprises sending a simulated control window of the virtual server service via a host server system, the simulated control window having a plurality of demonstration components that simulate corresponding system administration components of an active control window of the virtual server service.

11. The method of claim 10, further comprising:
receiving a second request from the prospective client system after sending the simulated control window, the second request being a request to send a first systems manager page of a first demonstration component of the simulated control window; and
sending the first systems manager page via the host server system to the prospective client system in response to the second request, the first systems manager page having at least one first element that can be selected by the prospective client to request that the host server system send another web page related to the first systems manager page.

12. The method of claim 10, further comprising:
receiving a second request from the prospective client system after sending the simulated control window, the second request being a request to send a first systems manager page of a first demonstration component of the simulated control window; and
sending the first systems manager page via the host server system to the prospective client system in response to the second request, the first systems manager page having at least one input field that the prospective client can input a hypothetical value for configuring the virtual server service.

13. The method of claim 10, further comprising:
receiving a second request from the prospective client system after sending the simulated control window, the second request being a request to send a first systems manager page of a first demonstration component of the simulated control window; and
sending the first systems manager page via the host server system to the prospective client system in response to the second request, the first systems manager page having at least one pull down menu having a plurality a choices from which the prospective client can select a hypothetical value for configuring the virtual server service.

14. The method of claim 10 wherein the demonstration components of the simulated control window comprise a server status component, an event manager component, a software manager component, a file manager component, an email manager component, a user manager component, a web manager component, and a database manager component, and wherein the method further includes:
receiving a second request from the prospective client system after sending the simulated control window to the prospective client system, the second request being generated from the prospective client system by selection of one of the demonstration components; and sending a selected systems manager page to the prospective client system in response to the second request, the selected systems manager page corresponding to the selected demonstration component.

15. A method of demonstrating a virtual server service that provides use of a host server computer to a plurality of clients over a computer network, the method comprising:

under control of a prospective client system, sending a first request to the host server computer for demonstrating the virtual server service; and displaying at the prospective client system a simulated control window of the virtual server service received from the host server computer in response to the first request from the prospective client system, the simulated control window having a plurality of demonstration components that simulate corresponding administration components of an active control window of the virtual server service.

16. The method of claim 15, further comprising:

sending a second request from the prospective client system after receiving the simulated control window, the second request being a request to send a first systems manager page of a first demonstration component of the simulated control window; and displaying the first systems manager page at the prospective client system in response to the receipt of the first systems manager page, the first systems manager page having at least one first element that can be selected by the prospective client to send another request to the host server computer for another web page related to the first systems manager page.

17. The method of claim 15, further comprising:

sending a second request from the prospective client system after receiving the simulated control window, the second request being a request to send a first systems manager page of a first demonstration component of the simulated control window; and displaying the first systems manager page at the prospective client system in response to the receipt of the first systems manager page, the first systems manager page having at least one input field that the prospective client can input a hypothetical value for configuring the virtual server service.

18. The method of claim 15, further comprising:

sending a second request from the prospective client system after receiving the simulated control window, the second request being a request to send a first systems manager page of a first demonstration component of the simulated control window; and displaying the first systems manager page at the prospective client system in response to the receipt of the first systems manager page, the first systems manager page having at least one pull down menu having a plurality a choices from which the prospective client can select a hypothetical value for configuring the virtual server service.

19. The method of claim 15 wherein the demonstration components of the simulated control window comprise a server status component, an event manager component, a software manager component, a file manager component, an email manager component, a user manager component, a web manager component, and a database manager component, and wherein the method further includes:

sending a second request from the prospective client system after receiving the simulated control window to the prospective client system, the second request being generated from the prospective client system by selection of one of the demonstration components; and displaying a selected systems manager page at the prospective client system in response to the receipt of the selected systems manager page.

20. A system for demonstrating a computerized transaction to a prospective client, comprising:

a computer having a central processing unit that executes instructions to construct and transmit active account messages and demonstration messages, a memory for storing instructions to be executed, and a non-volatile storage medium;

an active account module stored on the non-volatile storage medium, the active account module having an active account database, the database containing account data associated with a plurality of active accounts, and an active account control window having a plurality of system administration components operable to effectuate a computerized transaction associated with one of the active accounts;

a demonstration module stored on the non-volatile storage medium, the demonstration module having a plurality of demonstration messages containing demonstration components operable to simulate a computerized transaction not associated with one of the active accounts; and instructions stored in the memory of the computer that cause the central processor to—

(a) retrieve a demonstration message from the demonstration module in response to a request from a prospective client without first setting up an active account for the prospective client; and (b) transmit the retrieved demonstration message to a prospective client system of the prospective client using a transmission medium.

21. The system of claim 20 wherein:

the active account components comprise a plurality of dynamic web pages that provide active tools for sending instructions to the computer to effectuate the computerized transaction; and the demonstration messages comprise static web pages that provide replicas of the active account web pages and replicas of the active tools that do not provide instructions to effectuate the computerized transaction.

22. The system of claim 20 wherein the computerized transaction is providing a virtual server service to resellers for configuring a virtual server via a computer network, and wherein:

the system administration components comprise a plurality of dynamic web pages that provide active tools for sending instructions to the computer to configure the virtual server service of the active client; and the demonstration messages comprise static web pages that provide replicas of the active account web pages and replicas of the active tools, the replicas of the active tools being disabled from sending instructions to the computer to configure the virtual server service.

23. The system of claim 22 wherein the demonstration messages comprise an event manager web page having an element to simulate control of an event of the virtual server service.

24. The system of claim 22 wherein the demonstration messages comprise a software manager web page having an element to simulate installation and/or uninstallation of a software package of the virtual server service.

25. The system of claim 22 wherein the demonstration messages comprise an email manager web page having an element to simulate control of an email unit of the virtual server service.

26. The system of claim 22 wherein the demonstration messages comprise a database manager web page having an element to simulate control of a database of the virtual server service.

27. A virtual server service system for providing a virtual server service to an active client, comprising:
- a host server having a central processing unit that executes instructions to construct and transmit active account messages and demonstration messages, a memory for storing instructions to be executed, and a non-volatile storage medium;
- an active account module stored on the non-volatile storage medium, the active account module having an active account database, the database containing account data associated with a plurality of active accounts, and an active account control window having a plurality of system administration components operable to configure the virtual server service in a desired configuration associated with one of the active accounts;
- a demonstration module stored on the non-volatile storage medium, the demonstration module having a plurality of demonstration messages containing demonstration components operable to simulate configuring of the virtual server service in a configuration not associated with one of the active accounts; and
- instructions stored in the memory of the computer that cause the central processor to—
  (a) retrieve a demonstration message from the demonstration module in response to a request from a prospective client without first setting up an active trial account for the prospective client, and
  (b) transmit the retrieved demonstration message to a prospective client system of the prospective client using a transmission medium.

28. The system of claim 27 wherein:
- the system administration components comprise a plurality of dynamic web pages that provide active tools for sending instructions to the computer to configure the virtual server service of the active client; and
- the demonstration messages comprise static web pages that provide replicas of the active account web pages and replicas of the active tools, the replicas of the active tools being disabled from sending instructions to the computer to configure the virtual server service.

29. The system of claim 27 wherein the demonstration messages comprise an event manager web page having an element to simulate control of an event of the virtual server service.

30. The system of claim 27 wherein the demonstration messages comprise a software manager web page having an element to simulate installation and/or uninstallation of a software package of the virtual server service.

31. The system of claim 27 wherein the demonstration messages comprise an email manager web page having an element to simulate control of an email unit of the virtual server service.

32. The system of claim 27 wherein the demonstration messages comprise a database manager web page having an element to simulate control of a database of the virtual server service.

33. A computer-readable medium having contents that cause a computer system to demonstrate a virtual server service that provides use of a host server computer to a plurality of clients over a computer network by:
- sending an active control window of an active account of the virtual server service from the host server computer to an active client system in response to an active request from the active client computer system; and
- sending a simulated control window of the virtual server service to a prospective client computer system that does not have access to an active account in response to a request received at the host server from a prospective client to demonstrate the virtual server service.

34. A method of demonstrating a virtual server service that provides use of a host server computer to a plurality of clients over a computer network, the method comprising:
- receiving an active request from an active client to send an active control window from the host server computer to a first client computer system, the active client having an active account on the host server computer allowing configuration of the virtual server service;
- receiving a first request at the host server computer from a prospective client to demonstrate the virtual server service, the prospective client not having an account on the host server allowing configuration of the virtual server service; and
- under control of the host server, sending a simulated control window to a second client computer system in response to the first request, the simulated control window having a plurality of demonstration components that simulate corresponding system administration components of the active control window.

* * * * *